Nov. 14, 1972  P. C. SHERBURNE  3,702,646
SHOCK ABSORBER FOR FLUID SYSTEMS
Filed Oct. 16, 1970  6 Sheets-Sheet 1

INVENTOR
PHILIP C. SHERBURNE
BY
H. Edward Foerch
ATTORNEY

INVENTOR
PHILIP C. SHERBURNE
BY
H. Edward Tosevich
ATTORNEY

3,702,646
SHOCK ABSORBER FOR FLUID SYSTEMS
Philip C. Sherburne, 260 W. Exchange St.,
East Providence, R.I. 02903
Continuation-in-part of application Ser. No. 22,615, Mar. 25, 1970. This application Oct. 16, 1970, Ser. No. 81,295
Int. Cl. F16f 9/19, 9/34
U.S. Cl. 188—280                                                                                                      9 Claims

ABSTRACT OF THE DISCLOSURE

A shock absorber for a fluid handling system, such as a steam piping system, in which a cylinder and piston assembly are connected between the fluid handling system and a fixed structure. A fluid conduit system provides communication between portions of the cylinder on opposite sides of the piston. An improved snubber valve controls flow through the fluid conduit system. The snubber valve has opposed check valves which are resiliently and adjustably biased to an open position to permit fluid flow through the conduit system during periods of normal rates of movement of the steam piping system relative to the fixed structure. Greater than normal movement, such as produced by shock conditions, causes fluid to flow through the snubber valve at a rate which closes one or the other check valves depending on the direction of fluid flow to stop further fluid flow through the conduit system. The check valves have frusto-conical seating surfaces. An adjustable orifice provides controlled leakage around both check valves, and in a modification, separate adjustable orifices provide controlled leakage around each check valve.

CROSS REFERENCES TO OTHER APPLICATIONS

This application is a continuation-in-part of my application Ser. No. 22,615, filed Mar. 25, 1970, now abandoned.

BRIEF SUMMARY OF THE INVENTION

In steam piping systems and in many other piping systems, thermal contraction and expansion in response to temperature changes in the system cause movements of the pipe Moderate rates of movement are not likely to damage the piping system and are permitted. Stops may be provided to limit maximum movement at moderate rates. At times, however, such piping systems are subjected to relatively violent shock conditions, and an opposing force must be applied immediately to prevent excessive movement which could damage the piping system. A shock condition as used herein means a condition which would produce a movement of piping system relative to a fixed structure such as a building which supports the piping system at a rate which is greater than a predetermined desired rate. Shock absorbers, or sway braces, are currently used to control movements of piping systems caused by these thermal and other shock conditions.

Useful shock absorbers are available for controlling movement of piping systems in response to shock conditions or other movements. One such shock absorber is disclosed by my Pat. No. 3,106,992. A cylinder and piston are connected to control relative movement between the piping system and a fixed structure; and relative movement of the piston in the cylinder is controlled by a snubber valve in a fluid exchange system connected to portions of the cylinder on opposite sides of the piston. Slow movements due to thermal changes are accommodated without undue interference. On the other hand, violent movement caused by shock conditions are resisted with a high stiffness by the shock absorber.

For certain applications the performance requirements for shock absorbers place strict limits on the permitted movement of the piping system under maximum shock conditions. Stated another way, the shock absorber is required to have an extremely high stiffness under shock conditions. In such cases and for the smaller-sized shock absorbers, standard bore and piston manufacturing tolerances permit excess leakage through the snubber valve so that the shock absorber does not meet performance requirements; and manufacturing tolerances close enough to meet design requirements for leakage movement under maximum load conditions are impractical. For example, using standard manufacturing tolerances, an 8 inch shock absorber of the type disclosed by my Pat. No. 3,106,992 loaded at 5500 pounds per square inch, was found to have a by-pass leakage of 140 cubic centimeters per minute which is equivalent to approximately 0.200 inch per minute of relative movement of the piston and cylinder. Essentially all of the movement was derived from the by-pass leakage through the snubber valve. While such leakage movement may be acceptable, the leakage movement for similar shock absorbers of a smaller size would increase substantially and would not meet the stricter performance requirements.

It is an object of the present invention to provide a hydraulic shock absorber for protecting a piping system against shock conditions by which better control is obtained of movements of a piping system under shock conditions.

Another object is to provide a shock absorber having higher stiffness and greater adjustability characteristics.

Another object is to provide a shock absorber having a snubber valve which provides opposed check valve having frusto-conical seating surfaces with the check valves being resiliently biased to an opened position.

Another object is to provide a snubber valve which has a simple design, does not require special manufacturing tolerances and has a lower minimum leakage in its closed condition.

These objects are achieved in accordance with the present invention by a shock absorber comprising a piston and cylinder assembly and an improved snubber valve which is positioned in a fluid conduit system providing fluid communication between portions of the cylinder on opposite sides of the piston. The snubber valve includes opposed check valves having frusto-conical seats which close tightly even though produced using normal manufacturing tolerances. The valve members of the check valve are resiliently biased toward open positions by springs. As fluid flow generated by a relative movement of the piston and cylinder flows through the conduit system and snubber valve, the fluid flow forces act on the related valve member and tend to close the valve member on its seat.

Relative movement of the piping system with respect to the building which is less than a predetermined rate does not produce a rate of fluid flow through the fluid system or a closing pressure which is sufficient to close the related check valve. Shock conditions, causing greater than normal fluid flow or pressure, close the related check valve and thereby arrest further relative movement caused by the shock conditions. An adjustment is provided for the resilient bias to permit a selection of the magnitude of the shock condition to which the shock absorber will respond. Since at times some movement of the piping system is desired even under shock condition loads and to permit normal movement following a shock condition, an adjustable by-pass is provided around the check valves of the snubber valve.

Further objects and advantages of the present invention will be apparent from the following description and the accompanying drawings in which the preferred embodiment of the present invention is described and shown for illustrative purposes only.

Figure 1:
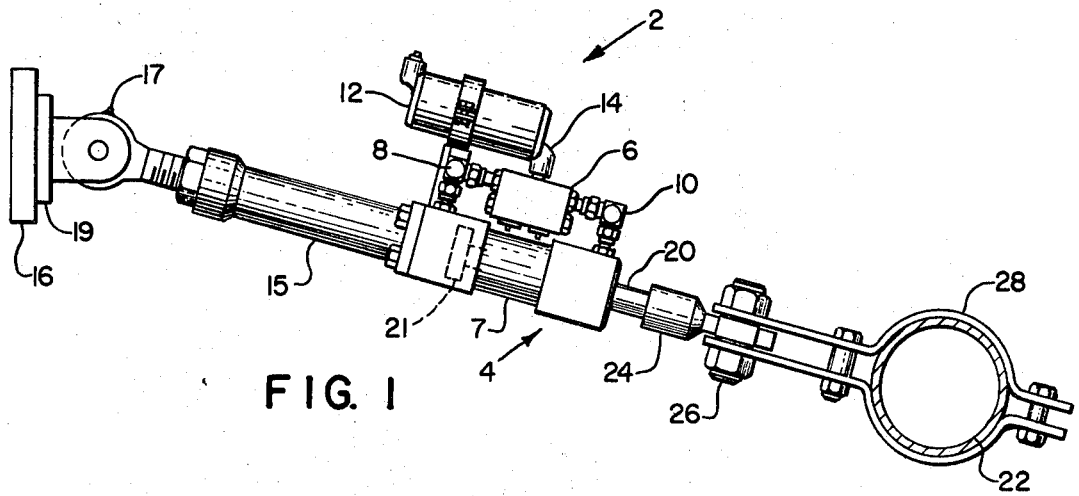
FIG. 1 is a plan view showing an installation of a shock absorber with a snubber valve embodying the present invention.

With reference to FIG. 1 of the drawings, a shock absorber 2 is shown which embodies the present invention and comprises a piston and cylinder assembly 4. A snubber valve assembly 6 is mounted on the cylinder 7 of the piston and cylinder assembly. Fluid conduits 8 and 10 connect the piston and cylinder assembly 4 with the snubber valve assembly 6 to provide a fluid conduit system interconnecting the two ends of the cylinder 7. A vented fluid reservoir tank 12 is mounted on cylinder 7 and a reservoir conduit 14 connects the reservoir tank 12 with the snubber valve 6.

The cylinder 7 of the piston and cylinder assembly 4 is attached through an extension 15, a conventional pivoted connection 17 and a bracket 19 to a fixed structure, such as a member 16 of a building. A piston rod 20 of the piston and cylinder assembly extends from piston 21 and is attached to a section of pipe 22 of a steam piping system through a conventional end connection 24, a conventional clevis pin 26 and a conventional pipe strap 28. With the shock absorber mounted in this manner, relative movement of the pipe 22 with respect to the fixed member 16 in directions toward or away from the fixed member 16 will move the piston 21 longitudinally within the cylinder 7.

As the piston 21 moves relative to the cylinder 7, it creates a pressure tending to force fluid from one end of the cylinder 7. For example, movement of the pipe 22 toward the fixed member 16 will tend to force fluid from the cylinder 7 through the conduit 8, the snubber valve assembly 6, and conduit 10 back to the other end of the cylinder 7. The snubber valve assembly 6 controls flow through this fluid conduit system.

Figure 2:
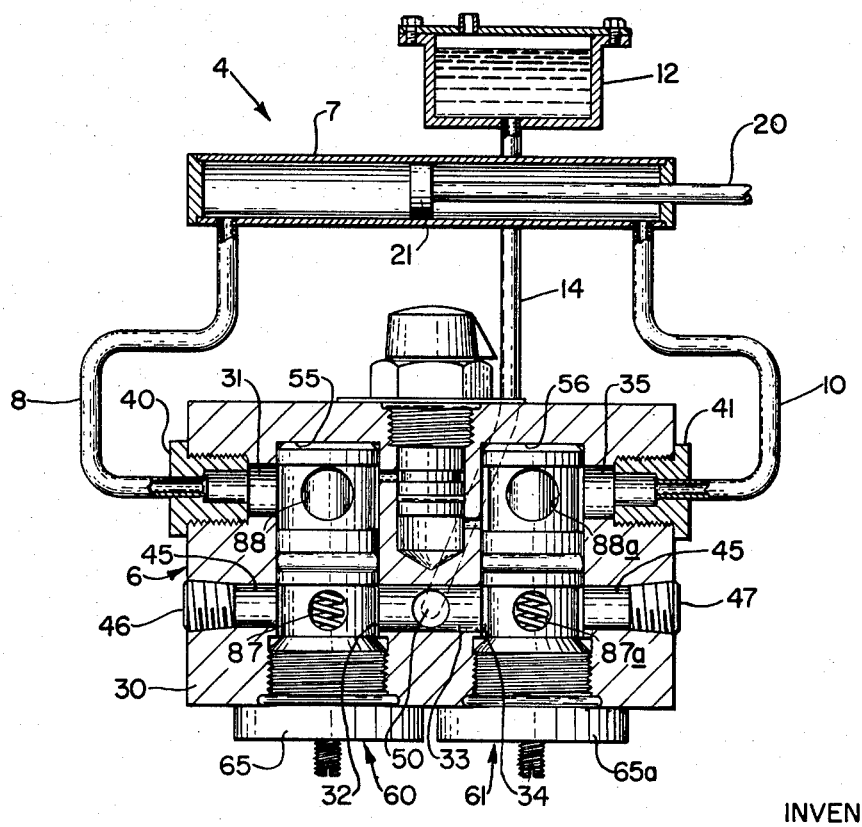
FIG. 2 is a partially diagrammatic view with a longitudinal sectional view of the snubber valve of FIG. 1.
Figure 3:
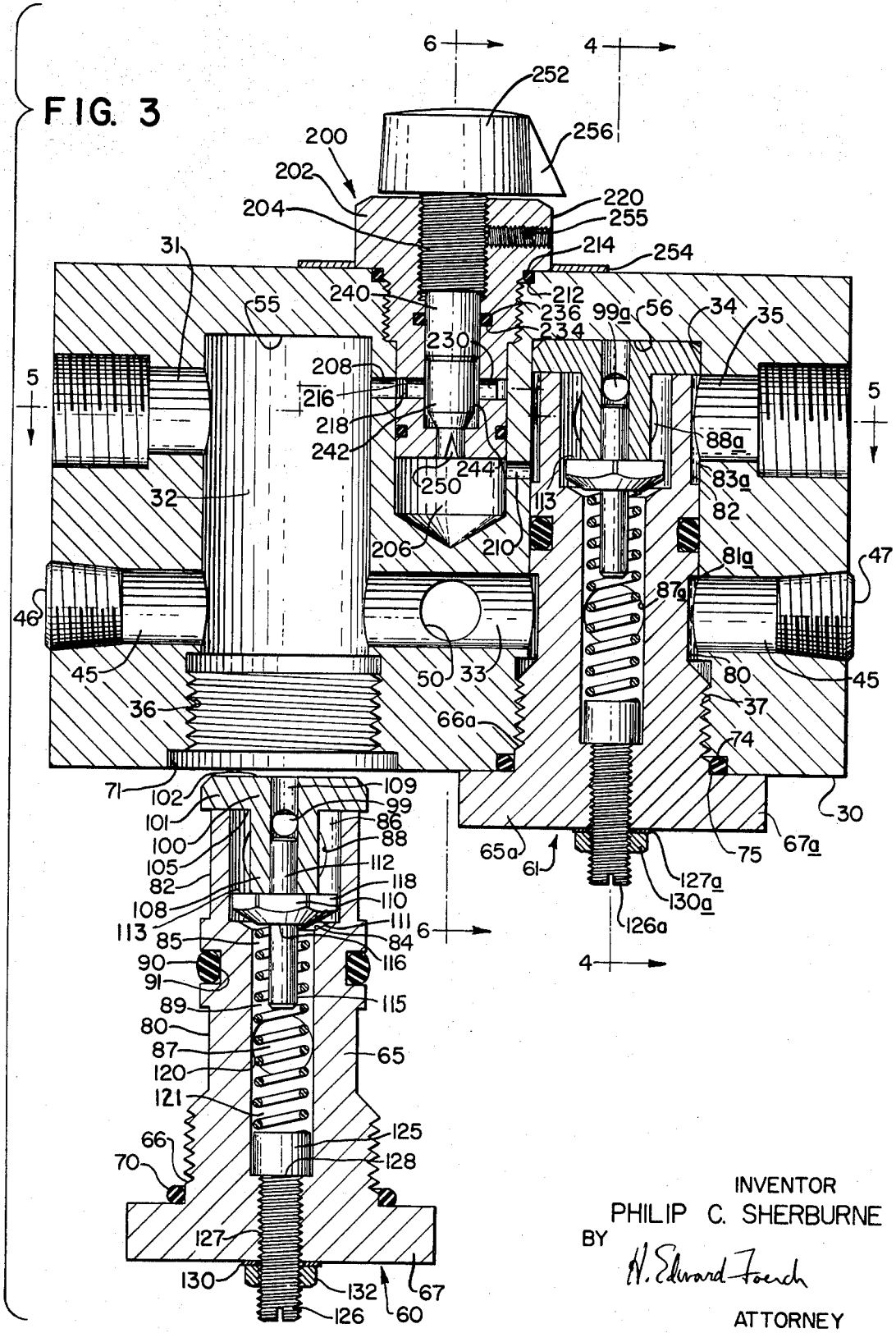
FIG. 3 is an enlarged view of the snubber valve shown in FIG. 2 with the check valves and the by-pass valve also shown in section and with one check valve displaced.
Figure 4:
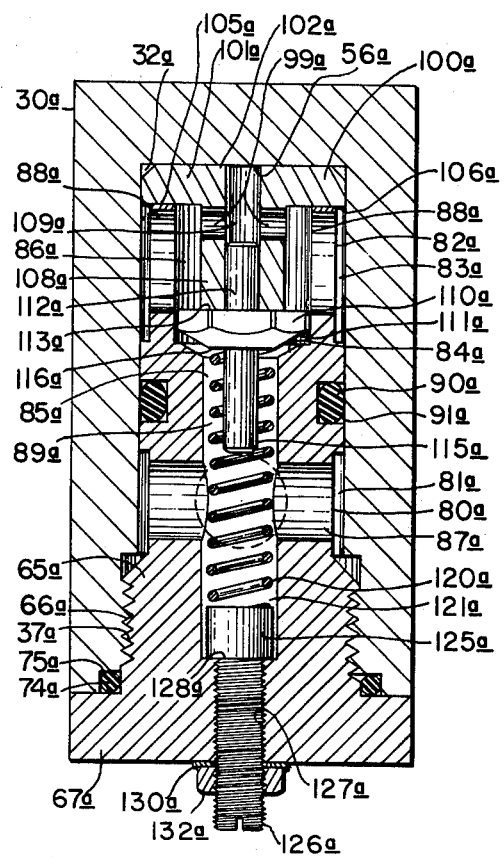
FIG. 4 is a sectional view taken along line 4—4 of FIG. 3.

Referring now to FIGS. 2 through 4, the snubber valve assembly 6 comprises a body member 30. Fluid passage means are formed through the body member 30 and comprises generally a passage 31, a cavity or chamber 32, a passage 33, a second cavity or chamber 34 and a passage 35. The passage 31 is threaded at its outer end to receive a fitting 40. The fitting 40 connects the conduit 8 to the passage 31 whereby the passage 31 has fluid communication with a portion of the cylinder 7 on one side of the piston 21. The other end of the passage 31 is open to the chamber 32. Similarly, a fitting 41 connects the conduit 10 with the passage 35 whereby the passage 35 has fluid communication with a portion of the cylinder 7 on the second side of the piston 21. The other end of the passage 35 is open to the chamber 34.

The passage 33 extends between the chamber 32 and the chamber 34. The openings of the passage 33 to the chambers 32 and 34 are spaced axially from the openings of the passage 31 and 35 to the chambers 32 and 34, respectively, to permit the positioning of check valves in the chambers 32 and 34 between said openings, as will be described hereinafter. The passage 33 may be conveniently formed by a bore 45 extending through the body member 30 and the chambers 32 and 34 and plugging the two ends of the bore 45 with plugs 46 and 47.

Figure 6:
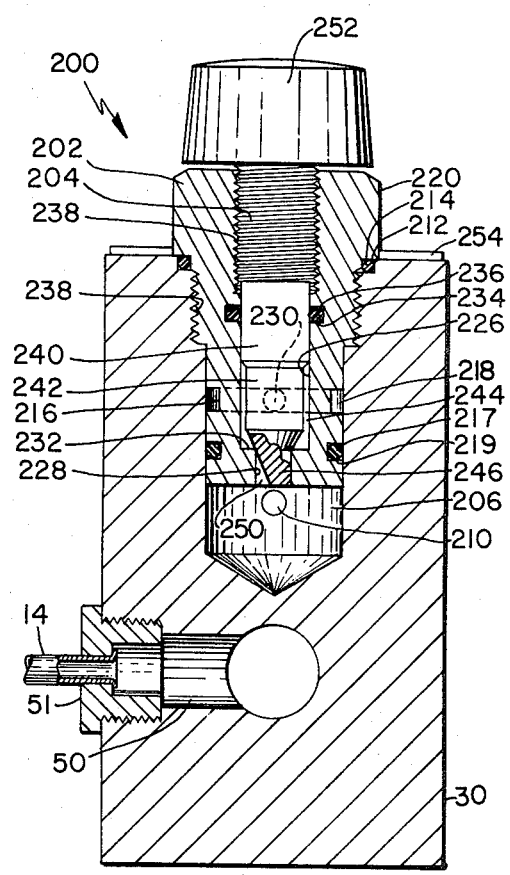
FIG. 6 is a sectional view taken along line 6—6 of FIG. 3.

A lateral fluid passage 50 in the body member 30 extends from the passage 33 to the outer surface of the body member 30, as seen in FIG. 6. The outer end of the passage 50 is threaded to receive a fitting 51 which connects the conduit 14 to the passage 50. Thus, the passage 50 is connected for fluid communication with the fluid reservoir 12.

The chambers 32 and 34 are identical and are formed preferably by parallel bores extending into the body member 30 for a suitable depth and terminating in surfaces 55 and 56, respectively. The outer ends of the chambers 32 and 34 are countersunk and threaded at 36 and 37.

Check valve means 60 and 61 are positioned in the chambers 32 and 34, respectively, and are arranged in an opposed relationship with respect to fluid flow through the snubber valve. In FIG. 3, the check valve 60 is displaced for a clear showing of the construction.

The check valve means 60 and 61 are identical. Therefore, only the structure of check valve means 60 will be described in detail; and when referring to check valve 61, an identical reference number followed by the letter *a* will be used to indicate the corresponding structure.

The check valve means 60 comprises a body member 65 having an outer diameter which fits comfortably in the chamber 32. The body member 65 has a threaded portion 66 which engages the threaded portion 36 of the chamber 32 to secure the valve means in the chamber 32. A cap portion 67 of the body member provides a means for engaging the threaded portions and further limits the axial position of the body member 65 in the chamber 32. An O-ring 70 is positioned in an annular groove 71 around the outer end of the chamber 32 and provides a fluid seal with the body member 65 and the cap portion 67. Similarly, an O-ring 74 is positioned in an annular groove 75 surrounding the outer end of the chamber 34 and provides a fluid seal with the cap portion 67a of the body member 65a. Relieved portions 80 and 82 in the body member 65 cooperate with the cylindrical wall of the chamber 32 to form annular cavities 81 and 83 (seen in FIG. 7). The annular cavity 81 is positioned to communicate with the passage 33 and the annular cavity 83 is positioned to communicate with the passage 31.

A fluid passage is provided through the body member 65 to provide a fluid flow path through the chamber 32 from the passage 31 to the passage 33. The body member 65 has a central passage 85 including a portion 89 and an enlarged diameter portion 86. The portion 89 of the passage 85 communicates with the annular cavity 81 through a port 87; and the enlarged diameter portion 86 communicates with annular cavity 83 through a port 88.

A frusto-conical valve seat 84 is provided in the surface between the portions 86 and 89 of the passage 85 and comprises an important feature of my snubber valve.

An O-ring 90 is positioned in a recess 91 in the body member 65 at a location between the reduced diameter portions 80 and 82. The O-ring 90 engages the cylindrical wall of the chamber 32 to provide a fluid seal between the chamber wall and the body member so that fluid flow between the annular cavity 81 and the annular cavity 83 must pass through the port 88, the passage 85 and the port 87.

A valve guide 100 is provided at the inner end of the chamber 32. The guide 100 includes a substantially cylindrical base 101 having an end surface 102 which is positioned against the surface 55 of the chamber 32. The base 101 is secured against axial movement by an end surface 105 of the body member 65. The valve guide 100 further includes an annular guide portion 108. A central bore 109 extends axially through the guide portion 108 and the base portion 101. The diameter of the guide portion 108 is less than the diameter of the enlarged portion 86 of the central bore 85; so that, although the guide portion 108 extends into the enlarged portion 86, it does not interfere with the fluid flow through the enlarged portion.

The check valve 60 includes a valve 110 which is positioned in the enlarged diameter portion 86 and which presents a frusto-conical seat surface 111 in opposed relation to the valve seat 84. The valve 110 has a lower stem 112 which extends axially from a surface 113 into the bore 109 of the guide 100 for a suitable distance and is slidably guided in the bore 109 for axial movement. A port 99 extends through the cylindrical guide portion 108 to permit fluid to flow into and out of the bore 109 as the stem 112 moves into and out of the bore 109. The valve 110 further has an upper stem 115 extending axially from a surface 116 adjacent to the frusto-conical seat surface 111. The radially outer surface of the valve 110 is shown as hexagonal with relieved portions 118 to provide a fluid passage around the valve 110 and through the passage 85. The outer surface of the valve 110 could be circular of a suitable diameter to permit fluid flow around the valve 110, however, it is important that the surface 113 extend radially beyond the outer surface of the guide portion 108 to present a surface area on which fluid forces can act thereby tending to move the valve axially toward a closed position. Thus, the valve 110 is mounted for movement between an open position with its seat portion 111 spaced from the seat portion 84 of the body member 65 and a closed position with its seat portion 111 engaging the seat portion 84 of the body member 65.

Resilient means are provided for resiliently biasing the valve in the open position. In the open position, the surface 113 is urged against an end of the annular guide portion 108 and fluid can flow freely over the valve seat and through the passage 85. These resilient means preferably comprise a coil spring 120 positioned in the passage 85 with one end of the spring 120 engaging the surface 116. The other end of the spring 120 is positioned in an extension 121 of the passage 85 and engages one end of a cylindrical plunger 125. The extension 121 has a suitable diameter to receive and provide some support to position the spring 120. The one end of the spring 120 surrounds and is supported by the upper stem 115 thereby preventing the spring from sliding onto the seat surface 111 of the valve and blocking the valve from closing.

A drive screw 126 is threadedly received in a tapped hole 127 formed axially of the body member 65 through the cap portion 67. The inner end 128 of the drive screw 126 engages an end of the plunger 125 thereby to move the plunger 125 axially to compress or relax the spring 120 and selectively adjust the resilient bias on the valve 110. A sealing washer 130 and a lock nut 132 are provided on the externally extending portion of the drive screw 126 to seal against fluid flow along the threads of the drive screw and to lock it in position after its position has been set.

As indicated above, the valve means 61 is constructed identically with the valve means 65, and the chamber 34 is identical with the chamber 32. Accordingly, the valve means 61 functions in the same manner as the valve means 60 and no further description of the valve means 61 or the chamber 34 are needed for an understanding of the structure or function of these features of the snubber valve 61.

Figure 5:
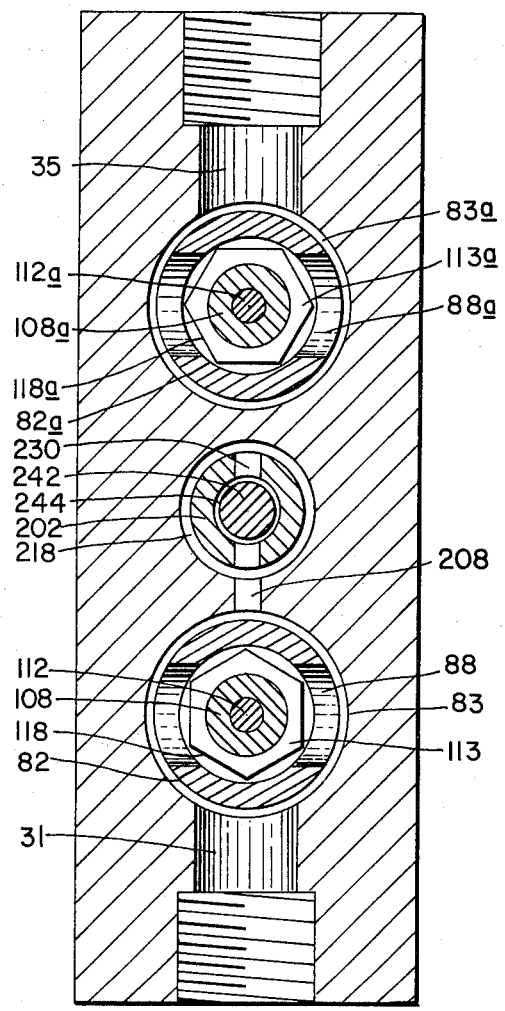
FIG. 5 is a sectional view taken along line 5—5 of FIG. 3.

With reference to FIGS. 3, 5 and 6, fluid by-pass means 200 are provided around the check valve means 60 and 61 for permitting a controlled by-pass flow of fluid through the snubber valve when either of the check valve means 60 or 61 are in a closed position. These by-pass means 200 comprise a by-pass valve body 202 and a valve member 204.

The body member 202 is positioned in a cavity or chamber 206 in the body member 30. The chamber 206 is connected to the chamber 32, and more particularly to the annular cavity 83, by a fluid passage 208. The chamber 206 is connected to the chamber 34, and more particularly to the annular chamber 83a by a fluid passage 210. The chamber 206 is preferably formed by a bore extending parallel to the chambers 32 and 34 for a suitable distance to accommodate the valve body 202. The outer end of the chamber 206 is threaded and an annular groove 212 is provided for an O-ring 214.

The body member 202 is substantially cylindrical. A reduced diameter portion 216 cooperates with the cylindrical wall of the chamber 206 to form an annular cavity 218 and the reduced portion 216 is so positioned along the body member that the cavity 218 is open to the fluid passage 208 when the body member 202 is positioned in the chamber 206. An annular groove 217 in the body member receives an O-ring 219 (seen in FIG. 6) to produce a fluid seal between the lower end of the body member and the wall of the chamber 206.

The body member 202 further has a cap portion 220, and the axial length of the body member which is shorter than the axial length of the chamber 206 so as not to block the opening of the passage 210 to the chamber 206. A threaded portion 224 of the body member engages the threaded outer end of the chamber 206 to secure the body member therein.

The body member 202 has a central passage which comprises a portion 226 and a portion 228 (see FIG. 6). Radial passages 230 connect the annular cavity 218 with the passage portion 226 for fluid flow therebetween. The passage portion 226 of the fluid passage is formed by a bore extending axially through the cap portion 220 and terminating at a surface 232. The outer end of the bore is threaded and a groove 234 adjacent to the threaded area receives an O-ring 236.

The valve member 204 has a threaded portion 238 which engages the threaded outer end of the chamber 206. The valve member 204 further has a cylindrical portion comprising a first section 240 which engages the O-ring 236 and provides a fluid seal therewith, a second section 242 which cooperates with the surface of the portion 226 of the central passage to form an annular cavity 244, and a third section 246 which is received in the portion 228 of the central passage. The third section 246 has a notch 250 having a tapered shape so as to completely block fluid flow through the passage portion 228 when the valve member 204 is positioned fully within the passage and so as to permit a controlled flow which is adjustable as the valve member is moved outwardly a short distance.

Figure 8:
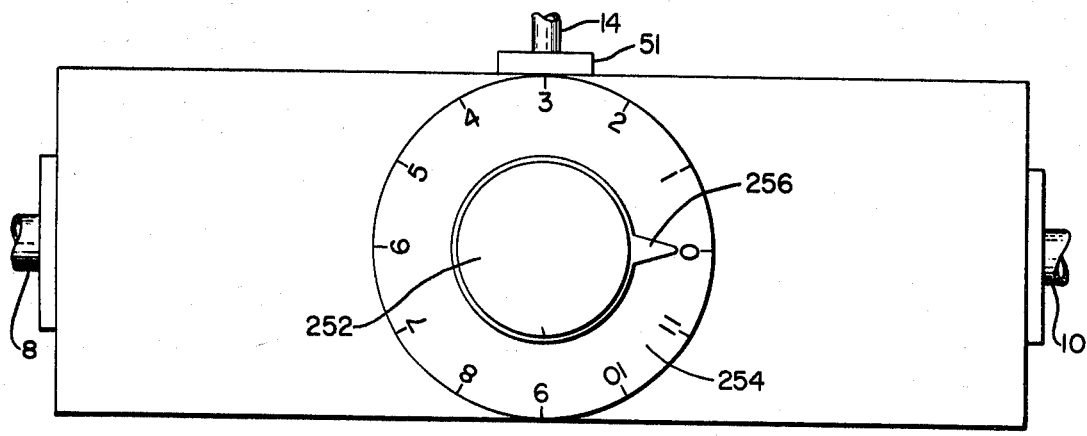
FIG. 8 is a top view of the snubber valve of FIG. 1.

A knob 252 is connected to the end of the valve member 204 by which the valve member may be rotated to produce axial movement of the valve member as the threaded portion 238 travels along the cooperating threaded outer end of the passage portion 226. A scale 254 which is positioned around the cap portion 220 and on the body portion 202 has suitable graduations (FIG. 8) marked on its upper surface, and a pointer 256 on the knob 252 indicates the bypass flow setting. In a fully closed position, no fluid flows through the by-pass means 200. By opening rotating the valve member 204 to some intermediate position, a controlled flow of fluid may pass through the by-pass means 200 thereby by-passing the check valves 60 and 61. A set screw 255, seen in FIG. 3, is provided in a tapped hole to lock the position of the valve member 204.

In operation, movement of the piping 22 (FIG. 1), for example toward the fixed structure 16, causes the piston 21 to move with respect to the cylinder 7 and creates a pressure which forces fluid to flow through conduit 8 (FIG. 2), through passage 31 to the annular cavity 83 through port 88 to the enlarged portion 86 of the passage 85, past the valve 110 which is biased in an open position (in FIG. 7, valve 110 is shown in a closed position as would occur for a shock condition of violent movement of pipe 22 toward the structure 16) through the port 87 to the annular cavity 81, to the passage 33. From the passage 33, fluid can flow either to the reservoir 12 through conduit 14 or to the cylinder 7 on the other side of the piston 21. As the piston 21 moves and forces fluid from one end of the cylinder 7, fluid flows into the cylinder 7 at the other end. Accordingly, with the above movement of the piping 22, fluid flows from passage 33 to the cavity 81a through port 87a, to the passage 85a, past the valve 110a, through the port 88a to the cavity 83a, to the passage 35, to the conduit 10 (FIG. 2), and into the cylinder 7. A small amount of the fluid will flow into the reservoir 12 to compensate for movement of the piston rod 20 into the cylinder 7.

If movement of the piping 22 were in a direction away from the fixed structure 16, fluid would flow in the reverse direction through the snubber valve 60 or from the conduit 10 to the conduit 8.

If the rate of movement of the piston relative to the cylinder is low enough, that is, it is below a predetermined rate, both check valves 60 and 61 remain open and relative movement of the piston and cylinder is not prevented. However, should the piping 22 be subjected to a shock tending to move it toward the fixed structure 16 at a rate which is greater than the predetermined rate, the resulting pressure on the fluid tending to force the fluid through the snubber valve 6 would be at a level which would generate forces on the surface 113 of the valve 110 and overcome the resilient bias of the spring 120. The valve 110 is thereupon moved axially to a closed position. As the seating surfaces 84 and 111 are conical, the surfaces mate perfectly without special manufacturing tolerances and the passage 85 is completely blocked to fluid flow. Under these conditions, the valve 110a remains in an open position so that make-up fluid can flow from the reservoir through the conduit 10 to the other side of the cylinder 7.

Alternatively, if the piping 22 is subjected to a shock condition in a direction away from the fixed structure 16, relative movement of the cylinder 7 and piston 21 causes fluid to flow from the cylinder 7, through conduit 10, the snubber valve 6, and conduit 8 at a rate which will act against the surface 113a of the valve 110a to move the valve 110a axially to a closed position.

Figure 7:
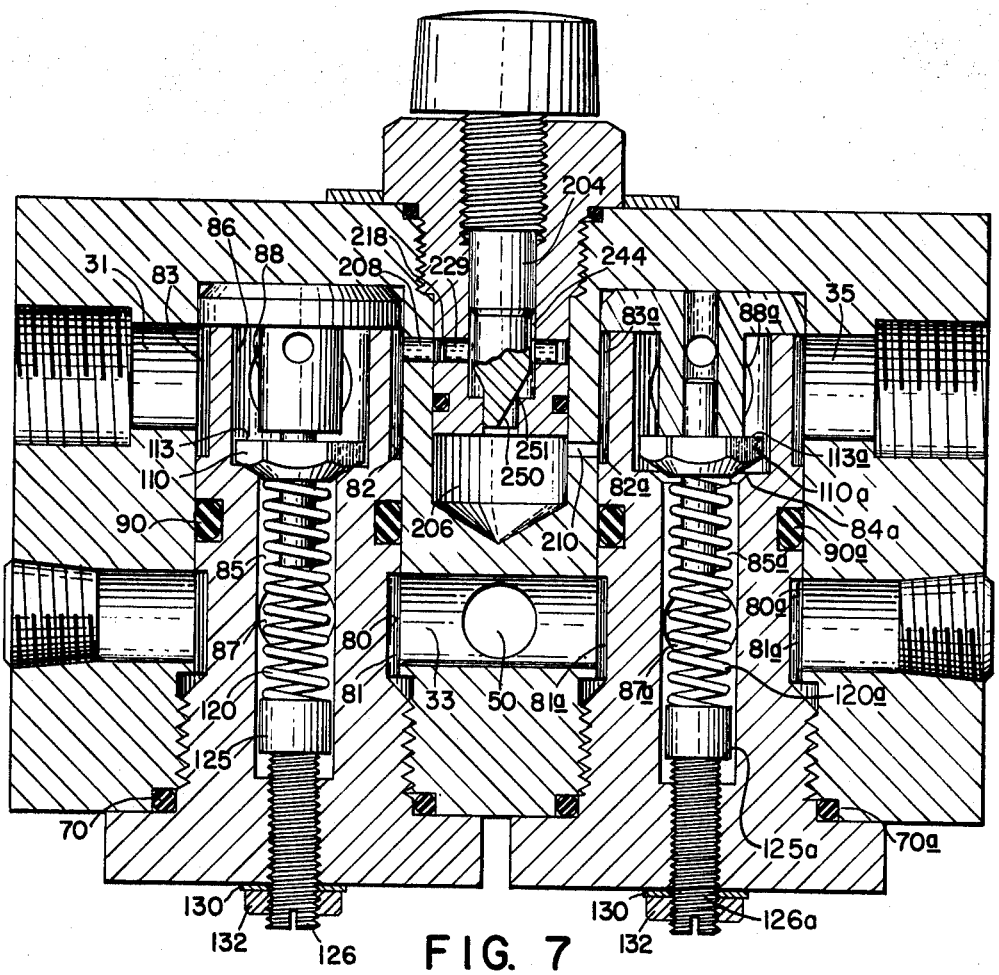
FIG. 7 is a sectional view of the snubber valve similar to FIG. 3, but varied to show one of the check valves in a closed position and to show an adjustment which increases the resilient bias on the valve members.

It will be apparent that when the drive screw 126 and the plunger 125 are moved inwardly or outwardly, the spring 120 is compressed or relaxed and that the resilient bias on the valve member 110 is thereby increased or decreased, respectively. The result is a change in the fluid pressure or the shock condition that is necessary to close the valve 110. FIG. 7 shows the drive screws 126 and 126a and the plungers 125 and 125a moved inwardly to compress the springs 120 and 120a.

The drive screws 126 and 126a are preset prior to connecting the snubber valve to the conduits 8 and 10. A precise setting for the desired flow conditions may be made conveniently using a test circuit connected to pass fluid through the snubber valve. In the test circuit, the drive screw 126 is moved inwardly to create a high bias on the valve 110. With a predetermined pressure acting on the surface 113, the drive screw 126 is moved outwardly. The bias created by the spring is decreased and the valve will close when the proper setting is reached responsive to the predetermined pressure. The setting is then locked by the lock nut 132. Drive screw 126a is similarly set.

The fluid by-pass means may be adjusted for a selectively controlled by-pass flow by changing the position of the valve member 204 by rotating the knob 252 and thereby form an orifice 251 which permits a desired flow. FIG. 7 shows the valve member 204 rotated to position the notch 250 to form an orifice 251 through which fluid may flow.

With a controlled flow through the by-pass means 200 and in the case of movement of the piping system 22 in a direction toward the fixed structure 16 so as to close valve 110, fluid would flow from the cylinder 7, through conduit 8, passage 31 and into cavity 83. From cavity 83, fluid can flow through port 88 and through the passage 208 to the cavity 218, then through the passage 230 to the annular cavity 244, then through the orifice 251 to the chamber 206 below the body member 202, then through the passage 210 to the annular chamber 83a, through the passage 35 to the conduit 10, and return to the reservoir 12.

In the case of movement of the piping system 22 in the opposite direction and with the valve 110a closed, flow through the by-pass means 200 would, of course, be in the opposite direction from that described above.

It is an important feature of the snubber valve as described above, that the check valve means 60 and 61 have frusto-conical seat surfaces 84 and 111 and 84a and 111a, respectively, which permit very little or no flow through the check valve means when said valves are in a closed position even without special manufacturing tolerances.

For example, using standard manufacturing tolerances, an 8 inch shock absorber with the herein described snubber valve loaded at 5500 pounds per square inch was found with the by-pass means 200 closed to have a bypass leakage of one-half cubic centimeter per second, and that none of the by-pass leakage was through the snubber valve.

Various fluids might be used in the shock absorber shown in FIG. 1, however, a fluid having a uniform viscosity for the temperature range in which the shock absorber will operate is desirable to provide uniform operation at all operating temperatures. One such fluid is a silicone fluid SF 1154, sold by the General Electric Company. This fluid provides a substantially uniform viscosity for the temperature range in which the shock absorber would be used, that is, 70° F. to 150° F. However, it has a compressibility of approximately five percent (5%).

When compressible fluids, such as SF 1154, are used in the shock absorber described above, it has been found that a violent movement of the pipe 22 in one direction followed immediately by a violent movement in the opposite direction can close both check valves 60 and 61 thereby creating a pressure lock against both sides of the piston 21 which prevents normal gradual movement of the pipe 22 until the pressure lock is broken. Since the by-pass means 200 shown in FIG. 3 provides communication between the two sides of the piston 21 only and not to the reservoir 14, the fluid pressure against the piston 21 cannot bleed off through the by-pass means 200. Also, the pressure does not leak off through the check valves 60 and 61 because of the completeness with which the conical seats of the check valves close.

Figure 9:
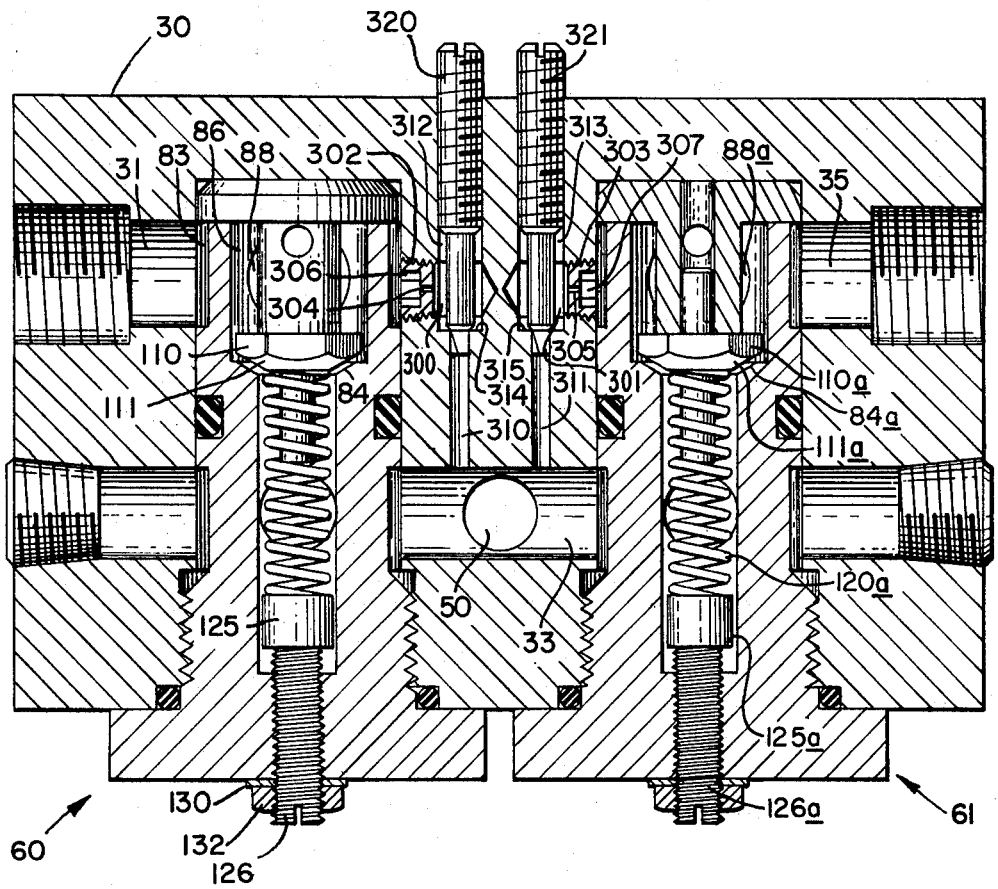
FIG. 9 is a sectional view of the snubber valve embodying a modification in accordance with the present invention.

FIG. 9 shows a modification of the by-pass means 200 of FIG. 3, in which separate by-pass passages are provided around each of the check valve means 60 and 61 to the reservoir 12, whereby a controlled, variable bypass passage is provided from each side of the piston 21 to the reservoir 14.

In this modification, bores 300 and 301 are formed in axial alignment with the passages 31 and 35 respectively and extend into body member 30, but do not meet. The outer ends of the bores 300 and 301 are tapped to receive plugs 302 and 303. The plugs 302 and 303 have fixed orifices 304 and 305, respectively. Cavities 306 and 307 are formed in the plugs 302 and 303 respectively, with surfaces adapted to receive a suitable screw driver for positioning the plugs in the tapped bores 300 and 301.

Bores 310 and 311 with counter-bore portions 312 and 313 intersect the bores 300 and 301, respectively, and extend from the surface of the body member 30 to the passage 33. The counter-bores 312 and 313 are threaded along their outer ends and terminate with inner surfaces 314 and 315, respectively.

Valve members 320 and 321 are threadedly positioned in the counter-bores 312 and 313, respectively. The valve members have first reduced-diameter portions which cooperate with the surface of the counter-bores 312 and 313 to form annular passages communicating with the orifices 304 and 305, respectively; and they have second reduced-diameter portions which are received in the bores 310 and 311, respectively. The second reduced-diameter portions are notched to form variable orifices with the surfaces 314 and 315, respectively.

In operation, movement of the pipe 22, for example, toward the building member 16 will close the valve 110, if the movement is above a predetermined rate. As further movement is resisted, the fluid in the system between the piston 21 and the valve 110 is compressed. Should such movement be followed immediately by movement in the opposite direction at a sufficient rate to close valve 110a, a pressure lock may occur if the valve 110a closes before sufficient movement of the piston 21 has taken place to release the compression of the fluid. However, the compression of the fluid will now be released as fluid flows around the valves 110 and 110a through the by-pass passages to the reservoir 12. Fluid will flow around valve 110 along a path which comprises the fixed orifice 304, the counter-bore 312, the variable orifice 314 and the bore 310 to the passage 33 and the reservoir 12. Similarly, fluid can flow around the valve 110a along a path which comprises the fixed orifice 305, the counter-bore 313, the variable orifice 315 and the bore 311 to the passage 33 and the reservoir 12.

The fixed orifices 304 and 305 in combination with the variable orifices are a suitable size to provide a sufficient relief to prevent creation of a pressure lock condition; but they control flow around the valves 110 and 110a such that by-pass leakage is within acceptable tolerances at full load conditions.

I claim:

1. A hydraulic shock absorber for a piping system, said shock absorber comprising a fluid controlled piston and a cylinder, one of which is adapted to be connected to said piping system and the other of which is adapted to be connected to a fixed structure;
   a first fluid conduit system including a fluid reservoir and conduits for providing fluid communication between two portions of said cylinder on opposite sides of said piston, whereby relative movement of said piston and said cylinder produces a fluid pressure causing fluid flow through said first fluid conduit system and snubber valve means for controlling fluid flow through said fluid conduit system, said snubber valve comprising:
   a snubber valve body having a second fluid conduit system formed therein as part of said first fluid conduit system;
   said second fluid conduit system being fluidly coupled to first and second sides of said fluid controlled piston;
   first and second non-coaxial fluid chambers forming a portion of said second conduit system;
   first and second independent check valve means opposingly positioned in said first and second fluid chambers respectively and adapted to close in response to fluid flow exceeding a predetermined rate from said first and second sides respectively of said piston thereby sealing said first and second fluid chambers;
   first and second biasing means coupled respectively to said first and second check valve means to bias said valve means in an open position;
   first and second adjusting means coupled to said first and second biasing means respectively for independently selecting said biasing force and therefore said fluid flow rate required to close said check valve means;
   first fluid passage means forming a portion of said second conduit system providing a first fluid passage between said first and second fluid chambers for transmitting fluid passed by said first and second check valve means;
   by-pass means positioned in said snubber valve body providing a second fluid passage between said first and second fluid chambers for transmitting fluid blocked by said first and second check valve means; and
   control means coupled to said by-pass means for selectively varying the fluid transmitting capacity of said by-pass means.

2. A shock absorber, according to claim 1, wherein said fluid reservoir is coupled to said first fluid passage means for maintaining a fixed volume of fluid on said first and second sides of said piston.

3. A shock absorber, according to claim 2, wherein said first and second check valve means each comprise:
   a check valve body having a check valve fluid passage formed therein; and
   a frusto-conical valve positioned within said check valve fluid passage.

4. A shock absorber, according to claim 3, wherein said first and second biasing means each comprise a spring positioned in the fluid passage of its associated check valve between a first end of said check valve body and the minor surface of its associated frusto-conical valve, and wherein said first and second adjusting means each comprise a plunger adapted to be moved within the fluid passage of its associated check valve for controlling the compression of its associated spring.

5. A shock absorber, according to claim 4, wherein said by-pass means comprises:
   a by-pass valve body having a third fluid passage, forming a portion of said second fluid passage, formed therein; and
   a by-pass valve having a tapered notch formed at one end thereof positioned in said third fluid passage, said tapered notch being movable by said control means into and out of sealing contact with said by-pass valve body for selectively varying the fluid transmitting capacity of said third fluid passage.

6. A shock absorber, according to claim 4, wherein said by-pass means comprises:
   a by-pass valve body having third and fourth fluid passages formed therein, said third and fourth fluid passages each forming a portion of said second fluid passage and each being coupled to said first fluid passage.

7. A shock absorber, according to claim 6, wherein said third fluid passage is coupled to said first fluid chamber and said fourth fluid passage is coupled to said second fluid chamber.

8. A shock absorber, according to claim 6, wherein said by-pass means further comprises first and second by-pass valves positioned in said third and fourth fluid passages respectively, said first and second by-pass valves each having a tapered notch formed at one end thereof.

9. A shock absorber, according to claim 8, wherein said control means comprises first and second drive means coupled to said first and second by-pass valves respectively, said first and second drive means being adapted to move the tapered notches associated with said first and second by-pass valves for selectively controlling fluid transmitting capacity of said third and fourth fluid passages respectively.

References Cited

UNITED STATES PATENTS

| | | | |
|---|---|---|---|
| 3,106,992 | 10/1963 | Sherburne | 188—313 X |
| 1,930,282 | 10/1933 | Olley | 188—299 |
| 2,032,124 | 2/1936 | Funston | 188—299 X |
| 3,419,114 | 12/1968 | Rumsey | 188—280 |
| 3,561,574 | 2/1971 | Dickinson, Jr. et al. | 188—280 |

GEORGE E. A. HALVOSA, Primary Examiner

U.S. Cl. X.R.

188—313